J. F. MULLANEY.
STRAINER FOR FLUIDS.
APPLICATION FILED MAR. 5, 1912.
1,225,993.
Patented May 15, 1917.
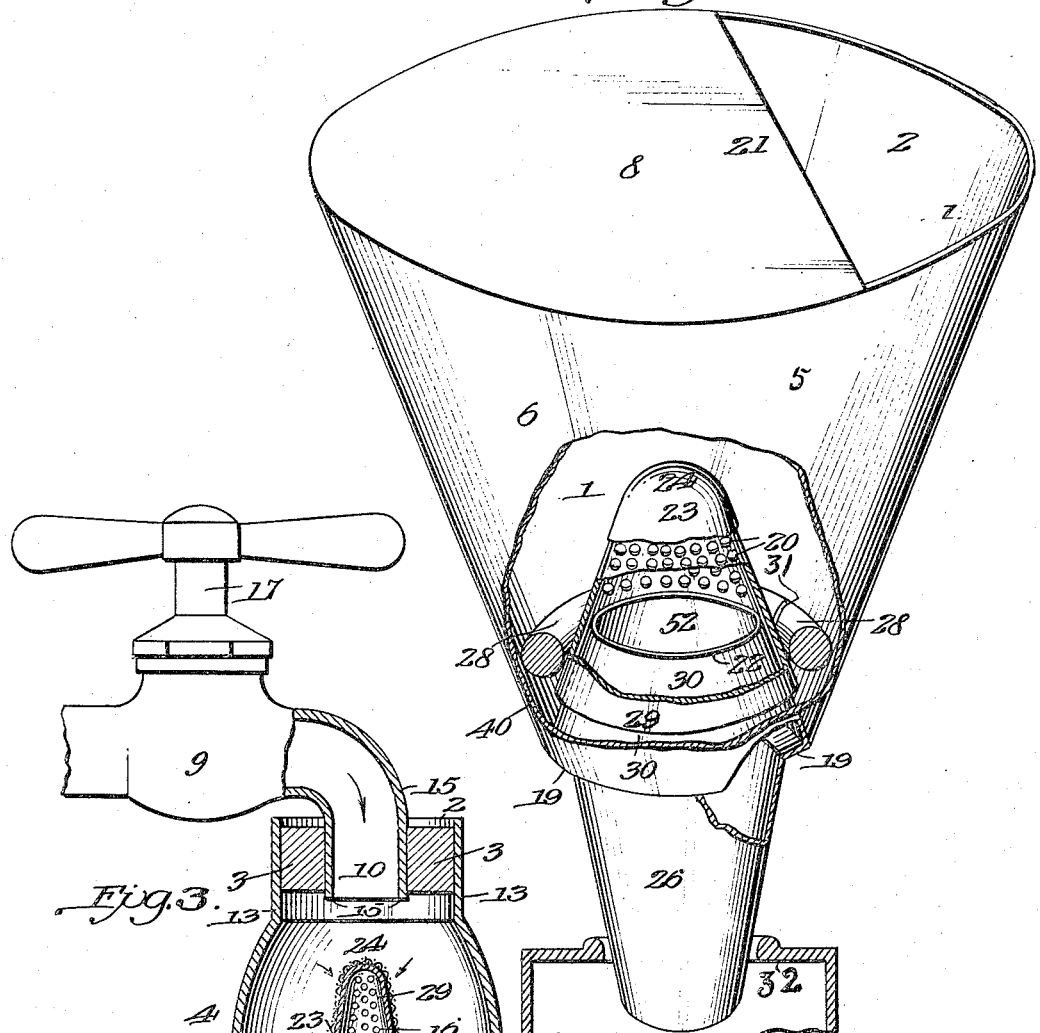
Witnesses.
Tho J Hughes
H. K. Wing
Inventor.
John F. Mullaney.

UNITED STATES PATENT OFFICE.

JOHN F. MULLANEY, OF COLORADO SPRINGS, COLORADO.

STRAINER FOR FLUIDS.

1,225,993.     Specification of Letters Patent.     Patented May 15, 1917.

Application filed March 5, 1912. Serial No. 681,692.

*To all whom it may concern:*

Be it known that I, JOHN F. MULLANEY, a citizen of the United States, residing at 110 East Pikes Peak avenue, in the city of Colorado Springs, in the county of El Paso and State of Colorado, have invented new and useful Improvements in Strainers for Fluids, of which the following is a specification.

My invention relates to improvements in strainers for fluids in which the strainer fabric or filtering member is supported in a dome-form or upright position as of a cone with a dome-shaped apex, so that the debris or rejected articles to be eliminated, pass down by the side of the strainer fabric to a trap below it, instead of being retained in the bottom of a sagging strainer fabric in the usual form; and the objects of my invention are, in part; first, to provide in the bottom of the strainer receptacle, a strainer that will eliminate from the liquid or the fluid all debris, germs, and foreign matter desired to be removed from the fluid; second, to provide a trap to retain said debris, germs and foreign matter from the liquid or the fluid; third, to provide means for readily assembling and disassembling the strainer apparatus with and from its proper receptacle, and the receptacle from connected appliance; fourth, to provide a strainer that is sanitary and easily cleaned.

I attain these objects by means of mechanism and appliances illustrated in the accompanying drawing, in which, Figure 1, is a perspective detail of the bottom part of the strainer.

Fig. 2, is a perspective of a strainer for gasolene.

Fig. 3 is an upright section of a strainer for water and to be used on a faucet.

Similar figures refer to similar parts throughout the several views.

The cone shaped support with its covering strainer-fabric and the inclosing receptacle, and having the walls inclosing the recess 40, about the base of said support, and adapted to receive and retain debris, constitute the principal parts of my invention.

The principles of my invention are carried out in varied forms to suit the peculiar requirements for straining fluids of various kinds and of various consistencies including cream, water, fruit juices, air and gases.

Projecting upwardly from the bottom of each of my forms of strainer as herein shown in Figs. 1, 2, 3, is a common cone shaped shell support 29, here shown detachably secured to an upwardly projecting flange 30, which is integral with the bottom of the strainer.

Over the supporting shell 29, in Fig. 2, is shown suspended a strainer 23, of chamois skin or other suitable skin or fabric provided to extend below the top 22, of the upward projecting annular flange 30, or below the bottom perforations 20, and which is secured to the bottom of the cone-shaped shell 29, by means of the retaining ring 28, being pressed down upon it and holding it in place by compression, by gravitation, and by the spring of the said ring.

The ring 28, as shown, is an open ring and has a tendency, by its own contraction, to bring its ends together at 31, and may be forced partly open when forced down to the large base of the cone 29.

In Fig. 1, part of the strainer fabric 23, is shown covering the apex 24, and part of it is shown removed to disclose the supporting cone-shaped shell, 29, with its numerous small orifices 25.

Part of the retaining ring 28, in Fig. 1 is also shown removed, disclosing the top edge 27, of the upward projecting annular flange 30, and the outlet 52.

Fig. 2 is especially for gasolene. Any foreign matter in the gasolene, such as water or other liquid or foreign particles having a greater specific gravity than gasolene, or forming larger globules, will slide off of the strainer 23, in the cavity of receptacle 6, and settle down into the trap beneath the retaining ring 28, which is below the top edge 22, of the upper projecting annular flange 30, where it will be retained without possible means of escaping to the outlet 52.

Any particles of water or debris coming into contact with strainer 23, above the line of the top 22, of the flange 30, will glance off and roll down the side to the quiet recess 40.

The nose 26, of the gasolene strainer Fig. 2, is provided to fit into the opening in the tank 32, to prevent the strainer from careening.

The shoulder rest 19, is provided to support the strainer on the receptacle 34.

In the bottom of the strainer receptacle in Fig. 1 is the upward projecting annular flange 30, integral with the bottom part of the receptacle, which is the floor of the annular trap recess 40. Removably mounted upon this flange is the perforated hollow shell 29, having the perforations 25, 25, provided to allow the strained fluid from the receptacle to pass into the outlet. The lower edge of this cone-shaped shell has no perforations below the top edge 27, of the flange 30, as there can be no liquid pass out downwardly below the edge 27.

The strainer fabric, proper, 23, covers the shell 29, and may be one or more thicknesses of cloth or other fabric and may be fine or coarse to suit the desired requirements and may be in the form of the plain cloth or may be formed in the shape of the cone as desired and is more preferably of washable or cleanable material.

Over the cone-shaped shell, 29, with its dome-shaped apex 24, and the strainer-fabric, 23, is forced down to the bottom, tightly, the retaining-ring, 28, as shown in Figs. 1, 2 and 3.

In straining cream or syrup or other thick or semi-liquid substance, I omit the strainer fabric, 23, and the retaining ring, 28, entirely, and use the perforated hollow shell, 29, as a sort of colander.

In the colandering of fruit, seeds, etc., will settle down into the annular trap-recess 40, and out of the way of the thick liquid. I apply it in the same way for animal pulp as I do for fruit pulp or other dense liquids.

In Fig. 3 is shown a form of the strainer receptacle with the wall 7, curved, and an upward projecting annular flange 30, surmounted by a perforated supporting shell 29, over which is stretched the strainer fabric 23, and secured around the bottom by the large heavy retaining ring 28. This form of receptacle 3, is preferably made of somewhat transparent material, so as to disclose collected debris, and has a large intake 2, provided to allow easy access to its interior.

In the supporting shell 29, are perforations 16, 16, to allow the passage of fluids to the outlet 11.

The opening 2, of the neck 13, of the receptacle, in Fig. 3, is shown closed by a pliable gasket 3, into which is inserted the nose 15, of the supply pipe 9, having the shut off 17, and is represented as being held in place by the elasticity and friction of the gasket 3, but it may have other desirable means for securing it over the outlet 10.

Having thus described my invention I claim:—

1. The combination of a strainer for milk, water or other liquids comprising a receptacle having an intake at its top and an outlet at its bottom, with an upward projecting strainer shell approximately of the shape of the frustum of a cone with a dome-shaped apex and covering said outlet, and being perforated from top to near its base and being liquid tight about its base so that the recess between its wall and the wall of the receptacle forms a trap adapted to receive debris and retain it from the strainer surface, and a cloth or fiber strainer member covering said shell and a heavy ring securing by compression said strainer member about the said base, substantially as set forth.

2. The combination in a strainer for milk, water or other liquids comprising a receptacle having an intake at its top and an outlet at its bottom, with an upward projecting perforated shell member in the form of a frustum of a cone with a dome-shaped apex, covering said outlet, the recess in the bottom of said receptacle and between said member and the wall of the receptacle forming a liquid tight trap for debris around the base of said member, a cloth or fiber strainer member covering said shell member and a heavy open ring securing said strainer member by compression about the said base, substantially as set forth.

3. In a strainer for liquids in combination with a receptacle having an intake at its top and an outlet at its bottom, an upwardly projecting flange about its outlet, forming a trap recess between it and the wall of the receptacle adapted to receive and retain debris, a shell member with perforated walls in the form of the frustum of a cone with a dome-shaped apex, detachably secured to the top of said flange and covering said outlet, a cloth or other fabric strainer member covering said shell member and secured about the base of said shell member by means of an open spring ring dropped over said fabric and down to the base of said shell member and adapted to compress said strainer member, substantially as set forth and for the purposes specified.

4. In a strainer for milk, water or other liquids, a receptacle having an intake at its top and an outlet at its bottom, an upwardly projecting flange about its outlet, forming a trap recess between it and the wall of the receptacle adapted to receive and retain debris, a shell member with perforated walls in the form of the frustum of a cone detachably secured to the top of said flange and covering said outlet, in combination with a cloth or fabric strainer member covering said shell member and secured about the base of said shell member by means of a thick open ring dropped over said fabric and down to the base of said flange, substantially as set forth and for the purposes specified.

5. A strainer for liquids comprising a receptacle having an intake at its top and an outlet at its bottom, an upwardly projecting strainer shell approximately of the shape of the frustum of a cone with a dome-shaped apex and covering said outlet, and being perforated from top to near its base and being liquid tight about its base so that the recess between its wall and the wall of the receptacle forms a trap adapted to receive debris and retain it from the strainer surface, in combination with a cloth or fiber strainer member covering said shell and a heavy ring securing said strainer member about the said base, substantially as set forth.

6. In a strainer for water, milk or other liquids, a receptacle having an intake at its top and an outlet at its bottom, an upwardly projecting perforated shell member in the form of a frustum of a cone covering said outlet, the recess in the bottom and between said member and the wall of the receptacle forming a liquid tight trap for debris around the base of said member, a cloth or fiber strainer member covering said shell member and a heavy ring securing said strainer member about the said base, substantially as set forth and for the purposes specified.

7. In a strainer for liquids, the combination of a receptacle having an intake at its top and an outlet at its bottom, an upwardly projecting flange about its outlet forming a trap recess between it and the wall of the receptacle adapted to receive and retain debris, a shell member with perforated walls in the form of the frustum of a cone with a dome-shaped apex detachably secured to the top of said flange and covering said outlet, a fabric strainer covering said member and secured about the base of said member by means of a thick open ring dropped over said fabric and down to the base of said member, substantially as set forth and for the purposes specified.

8. In a strainer for liquids, a receptacle having an intake at its top and an outlet at its bottom, an upwardly projecting flange about its outlet, forming a trap recess between it and the wall of the receptacle adapted to receive and retain debris, a shell member with perforated walls in the form of the frustum of a cone with a dome-shaped apex, detachably secured to the top of said flange and covering said outlet, in combination with a fabric strainer covering said member and secured about the base of said member by means of a thick open ring dropped over said fabric and down to the base of said member, substantially as set forth, and for the purposes specified.

9. In a strainer for liquids, a receptacle having an intake at its top and an outlet at its bottom and having an upwardly projecting flange about its outlet forming a trap recess between the flange and the wall of the receptacle adapted to receive and retain debris, a hollow member with perforated walls in the form of a frustum of a cone with a dome shaped apex, detachably secured over said outlet and to the top of said flange, a fabric strainer member covering said hollow member and held close about the base of said trap recess by means of a thick open ring, substantially as set forth and for the purposes specified.

10. In a strainer of the class described for milk, water and other liquids, and having a receptacle with an intake at its top and an outlet at its bottom, and adapted to have the debris washed from the strainer filter proper and retained in a trap recess below the strainer part, the combination of an upwardly projecting shell member in the form approximately of the frustum of a cone with a dome-shaped apex and covering said outlet, and said shell member having perforations connecting the receptacle with the outlet and extending from its apex to near its base and leaving its base imperforate forming an imperforate trap in the bottom of the receptacle between the wall of the base of the shell and the wall of the receptacle, adapted to receive debris, a cloth or fabric strainer member covering said shell member and secured about its base with a compression ring, substantially as set forth and for the purposes specified.

11. In a strainer of the class described for milk, water and other liquids, having a receptacle provided with an intake at its top and an outlet at its bottom, and adapted to have the debris washed from the strainer filter proper and retained in a trap recess below the strainer part, the combination of an upwardly projecting shell member in the form approximately of the frustum of a cone with a dome-shaped apex and covering said outlet, and said shell member having perforations connecting the receptacle with the outlet and extending from its apex to near its base and leaving its base imperforate forming an imperforate trap recess in the bottom of the receptacle between the wall of the base of the shell and the wall of the receptacle adapted to receive debris, a cloth or fabric strainer member covering said shell member and secured about its base with an open and elastic compression ring, substantially as set forth and for the purposes specified.

12. In a strainer of the class described for milk, water and other liquids, having a receptacle provided with an intake at its top and an outlet at its bottom and adapted to have the debris washed from the strainer filter proper and retained in a trap recess below the strainer part, the combination of an upwardly projecting perforated shell member in the form approximately of the frustum of a cone with a dome-shaped apex and covering said outlet, an upwardly projecting flange member surrounding said outlet and adapted to support removably said shell member and having its base imperforate forming an imperforate trap recess in the bottom of the receptacle between the wall of the flange member and the wall of the receptacle and adapted to receive debris, a cloth or fabric strainer member covering said shell member and secured about its base with an open and elastic compression ring, substantially as set forth and for the purposes specified.

JOHN F. MULLANEY.

Witnesses:
  GERTRUDE HERREN,
  CLARENCE C. MILES,
  FRANKLIN BEATTIE.